3,188,318
PROCESS FOR PRODUCING PHTHALOCYANINES
Darrel E. Mack, Webster Groves, Mo., assignor, by mesne assignments, to Hercules Powder Company, Wilmington, Del., a corporation of Delaware
Filed Dec. 30, 1958, Ser. No. 783,976
12 Claims. (Cl. 260—314.5)

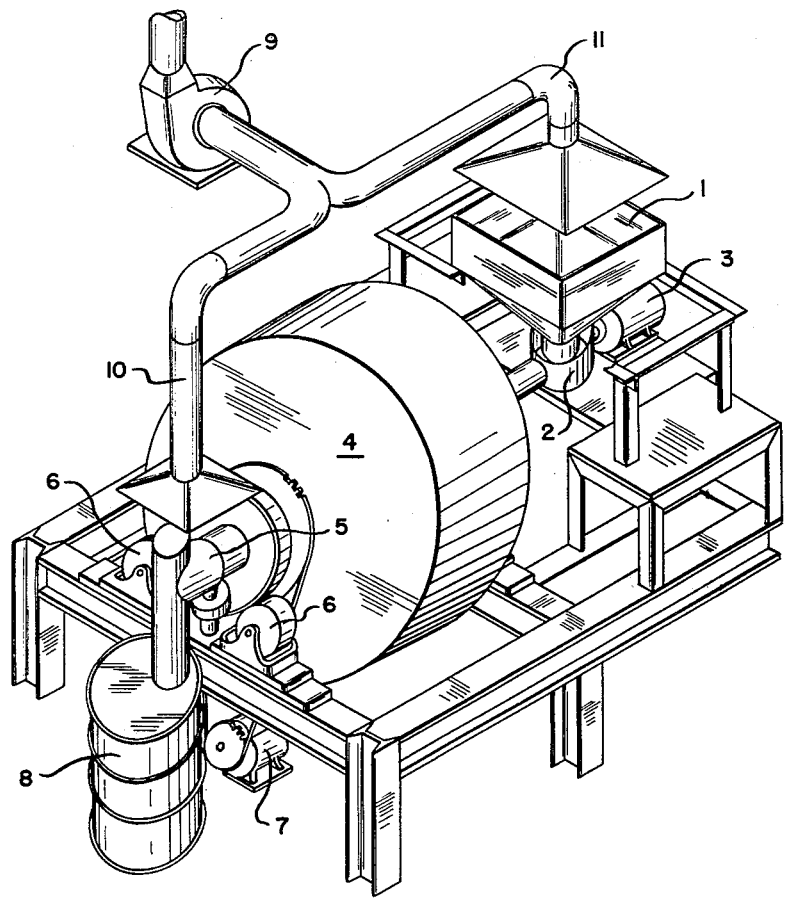

This invention relates to the production of phthalocyanine compounds for pigments, and has for its object the provision of an improved process for producing such compounds. The process of the invention is characterized by feeding the reacting constituents into an agitated dry, granular reacted phthalocyanine product which is maintained at the reaction temperature in an essentially oxygen-free atmosphere.

A common method of making phthalocyanine compounds is by the so-called "bake" method. The raw materials used are dependent on the product required but in all cases phthalic anhydride or a derivative of phthalic anhydride is used, such as phthalimide, phthalamide, ammonium phthalate, and phthalonitrile. When a substituted phthalocyanine product is required, such as chlorinated phthalocyanines, the corresponding substituted phthalic anhydride or its derivative is used. The two most important commercial pigments are copper phthalocyanine blue and copper phthalocyanine green. When making unsubstituted copper phthalocyanine blue, the raw materials used are phthalic anhydride, urea, cuprous chloride and a catalyst such as a molybdenum or zirconium salt. Other combinations are also used, such as phthalonitrile and copper or copper compounds. When producing copper phthalocyanine green, phthalic anhydride is replaced with tetra-chloro-phthalic anhydride. These raw materials, which are solids, are well mixed and "baked" in ovens at 170° C. to 210° C. for several hours. During the reaction period the materials go through several physical and chemical changes such as melting, foaming, solidifying, and finally ending as a brittle cake containing about 50% phthalocyanine, by-products believed to be nitrogenous derivatives of phthalic anhydride together with various compounds derived from urea alone, along with unknown compounds containing copper and catalyst. Because of the fusing tendencies of the reacting materials, sticking to the container surface has been a problem. As a result, the practice has been to bake the mixed raw materials as a stationary bed. Pan loaded baking ovens are commonly used.

The yields in the bake processes are invariably low, ranging from 40 to 80% and in an inconsistent manner. The gases which issue from the reaction are known to contain quantities of free ammonia and volatile compounds of phthalic anhydride, such as phthalimide. It is believed that the inconsistent results which are obtained from the bake process are caused by poor heat transfer through the viscous liquid and foam, stratifying of the undissolved components and local overheating. The gases from the reaction should consist of only ammonium carbamate and carbon dioxide, so any other gases which are formed, such as phthalimide mentioned previously, constitute a loss of yield. Stray air currents in the ovens are known to lower the yields also, by carrying out volatile intermediates.

An alternative method for making phthalocyanine compounds is known as the "Solvent" method. In this method, the raw materials are suspended in an organic liquid media such as nitro-benzene, and reacted at about 200° C. Phthalonitrile, or its substituted products, are generally used because they result in yields of over 95%. While the "Solvent" method produces much higher yields than the "Bake" method, it suffers from higher raw material and processing costs. The equivalent cost of phthalonitrile is higher than phthalic anhydride. Further, the organic liquid must be removed from the phthalocyanine before further processing to the pigmentary form. This usually involves a distillation step, with subsequent washing with a mutually soluble solvent, with final transfer to a water phase, for further handling. The organic liquid must also be recycled to maintain reasonable costs.

This invention is based on the discovery that a dry, granular phthalocyanine reaction product, such as is produced by the "Bake" method, is an excellent surface for reacting the constituents to produce additional of the same phthalocyanine compounds. This reaction product, in the reactor vessel, which I shall refer to as a "heel," is in a dry, granular state and at a temperature of from 130°° to 500° C., preferably at a temperature of from 130° C. to 250° C., and is continuously agitated while the reacting constituents are added at a controlled rate to form additional granular product. As the reacting components are fed continuously, or semi-continuously, into the heated, agitated, granulated mass, some of the reaction product is removed, preferably at a rate approximately equivalent to the feed rate. This insures that a constant ratio of feed to agitated reaction product is maintained.

The invention eliminates the objections of the "Bake" method, and gives the high yield of the "Solvent" method, but eliminates the need for using a reacting media which must be separated and recovered, in further processing, as is practiced in the "Solvent" method.

The process of the invention is concerned in general with the production of various phthalocyanine compounds, but will be described for convenience with reference to the production of copper phthalocyanine. According to the invention, the reacting components are fed into, and some of the product removed from, an agitated mass of reacted product, in granular form, maintained at the reaction temperature. It is important that the amount of agitated product be sufficient to prevent permanent bridging or caking of the agitated mass, from the addition of the reacting components. The minimum amount is best determined experimentally in the equipment being used because it will be affected by the particle size of the agitated mass, the degree of agitation, and the method of feed, whether intermittent or continuous. Any amount above the minimum point may be used, with the limit being determined by practical considerations, such as the size of the reacting unit.

Best results ore obtained when the mass is composed of particles less than one-half inch in diameter, preferably less than one-quarter inch in diameter, because of the increased surface obtained from smaller particles. We have used the term "granular mass" to describe the reaction mass as consisting of individual particles which are small in relation to the total mass, the amount of said mass undergoing treatment representing not less than the product of two hours feeding. This amount of mass is established on the basis of continuous feeding over the two-hour period, at a constant rate of feed.

This process can be operated either continuously or as a batch process. A batch process would involve the addition of raw materials, at a constant feed rate, or at periodic intervals, to an agitated granular mass of reaction product, until the raw materials equivalent to the batch size required, had been fed in to the reaction vessel. A portion of the increased mass is then removed, approximately equivalent to the raw materials fed. In a continuous process, raw materials feed into, and product discharge from the reaction mass, would be carried on at the same time, so that the reaction and mass remains essentially unchanged in composition, and in total weight. The feed rate and product discharge rate can be constant and continual, or at frequent, periodic intervals. In either case, the reaction mass can be agitated, for example, by a rotating shell, or by mechanical agitators, in a stationary shell. If desired, the raw materials feed can include a portion of re-cycled reaction product. It is important that the reaction vessel be designed to minimize or exclude air from within the reaction vessel, for maximum yields, and to minimize fire hazards.

We prefer continuous operation for our process although several advantages are to be gained over the common "Bake" method whether a continuous or batch process is used. The advantages are: (1) better heat transfer, with lower heat cost, (2) uniform temperature control, (3) continual intermixing of the reactants, (4) more efficient utilization of all raw materials, minimizing excesses of raw materials required in a stationary bake. (5) generally lower processing costs, and (6) high yields. Yields approaching theoretical, 95% or better, based on phthalic anhydride, or its derivative, have been obtained. The high yields are a resultant of uniform temperature control and continual intermixing of the reactants, combined with increased reaction time because of the retention of the reaction mass in the reaction vessel and its weight relation to the discharged product. For example, if the rate of feed into a reaction vessel and the rate of discharge from the reaction vessel were equivalent to one part of product per minute, and the weight of the reaction mass were 120 times the product discharge, than the average reaction time in the vessel would be two hours. A ten-fold increase would extend the average time to 20 hours. By varying the weight ratio of the reaction mass to the discharged product, then the average residence time in the reaction vessel can be varied as desired. While several hours reaction time is common in the "Bake" method, the raw materials tends to separate from each other and stratify in different layers, so that further reaction is not possible without re-mixing of the ingredients.

The process of the invention is particularly adapted for continuous operation because of advantages in processing costs. Accordingly, the accompanying drawing illustrates an arrangement of apparatus for carrying out a continuous operation.

The apparatus illustrated comprises a hopper 1 for holding a supply of raw materials having a feeder 2, such as a screw feeder driven by the motor 3, for feeding the material into the rotatable reactor vessel 4 which is a metal cylinder, for example stainless steel, of sufficient size with respect to the feed rate to hold the residence charge, called a "heel" which is equivalent to the amount of feed for at least two hours. The discharge duct 5 carries away the reaction product and the gases. The reactor vessel 4 is rotated on its horizontal axis supported on the rollers 6 by the drive equipment 7. The dry, granular phthalocyanine reaction product enters the product receiver 8 while the gases from duct 5 and hopper 1 are sucked by the blower 9 through ducts 10 and 11 respectively and discharged from the system.

The vessel 4 may be heated in any suitable way as by means of electricity or gas, and appropriate automatic heat control means (not shown) are used to maintain the proper temperature.

In carrying out a process of the invention in the apparatus illustrated, a "heel" of the reacted phthalocyanine product representing at least the equivalent of two hours feed is maintained in the vessel 4 at the reaction temperature of from 130° to 500° C. by external heating, advantageously in the range of from 130° to 250° C. The raw materials fall onto the "heel," are mixed in and brought up to the reaction temperature almost immediately. Because of the absorptive qualities of the "heel" the mixture never becomes sticky and lumpy. The gases are expelled easily throughout the mass and the reaction proceeds efficiently. Very little free ammonia odor is noted and a negligible amount of phthalic compounds are found in the off-gases which pass through ducts 5 and 10.

As the material is fed into the reactor from hopper 1, it pushes out an equivalent amount of "heel" through duct 5 in the other end of the drum through which the gases also issue. The reacted material now becomes part of the "heel." Thus, a large amount of reacted material is always present to absorb the raw materials being fed into the reactor. The reaction product is discharged as a free-flowing, dry, granular powder which can be further processed in the usual way to make pigments without the necessity of grinding. The process results in considerable savings in raw materials as well as in space, labor and heating costs.

Because the material is being continually mixed, no local overheating can take place. The gases issuing from the reaction have little or no ammonia odor and are practically free of condensable (sublimable) material, showing that side reactions are at a minimum. The design of the reactor, which delivers heat directly to the material, rather than to air and then to the material as ovens do, eliminates the necessity of air recirculation for heating. Thus, the vapor losses are very small.

Without intending to limit the invention, the following examples are given to illustrate the process:

*Example 1*

A mixture of 10.8 parts of phthalic anhydride, 20.2 parts of urea, 2.2 parts of cuprous chloride and 0.1 part of ammonium molybdate were passed at a rate of 1.3 lbs. per hour into a reactor of 0.45 cu. ft. total volume, containing 10 lbs. of crude product as a heel. This crude product was made up of particles less than one-quarter inch in diameter. The reactor contents were maintained at 180° C. and the reactor was rotated at 11 r.p.m.

The product came out as a dry, granular material composed of particles less than one-fourth inch in diameter, mostly powder which analyzed 75% copper phthalocyanine. After a running period of 72 hours, a material balance over the system showed that a yield of 96% based on phthalic anhydride had been achieved.

*Example 2*

The same as Example 1 except that the urea was lowered to 16.5 parts. The yield obtained, based on phthalic anhydride, remained essentially unchanged.

The above examples illustrate the use of phthalic anhydride and urea, to produce unsubstituted copper phthalocyanine. Other phthalocyanine compounds can be produced in a similar manner, by properly choosing the correct raw materials, as already established in prior art.

Although chlorine can be introduced into the molecule by direct synthesis, that is, by using monochlorophthalic anhydride as one of the raw materials, it would be desirable to eliminate the expense of monochlorophthalic anhydride. I have found that copper phthalocyanine can easily be chlorinated, up to 20% chlorine or better, by simply passing gaseous chlorine through the dry copper phthalocyanine at 160–200° C. Furthermore, this operation can be accomplished expediently in the rotary reactor 4 by feeding the unchlorinated phthalocyanine into the reactor and at the same time introducing chlorine through a pipe dipping into the material in the reactor. The unreacted chlorine and the hydrochloric acid by-products can be exhausted through the vent system 9 and 10.

Another substituent group, sulfonic acid, can also be introduced into the phthalocyanine molecule by using the rotary reactor in an equally simple manner. In this latter case, instead of chlorine, a dilute solution (5–10%) $H_2SO_4$ may be introduced into the reactor along with the phthalocyanine. About half of the sulfuric acid would react. The rest would be left as free acid (or phthalocyanine sulfate) which could be washed out in a later step in the process. Temperatures in the range of from 180° to 220° C. would be suitable for the sulfonation to take place. In the process the dilute acid distributes itself uniformly over the phthalocyanine particles. The water evaporates and the concentrated acid which remains performs the sulfonation. If desired, the sulfonated phthalocyanine product can be directly synthesized in the reactor described by starting with sulfonated phthalic anhydride, or a sulfonated derivative of phthalic anhydride.

In order to eliminate the necessity of using aqueous sulfuric acid, which might cause corrosion difficulties, $SO_3$ gas as a sulfonating agent or vaporized chlorosulfonic acid can be used. In the latter case chlorination as well as sulfonation will take place.

Although the foregoing examples refer only to the use of copper chloride it is to be understood that any neutral, basic or acid salt of one of the metals: iron, nickel, cobalt, aluminum, chromium, tin or magnesium, or mixtures thereof, may be used in place of the copper chloride. Also when using a copper salt, a part of this salt may be substituted by a salt of one of the aforementioned metals or a mixture of them.

I claim:

1. In the production of phthalocyanine compounds from the required proportions of urea, a metal compound of the group consisting of copper, iron, nickel, cobalt, aluminum, chromium, tin and magnesium, and an ortho-arylene derivative selected from the group consisting of ortho-arylene anhydrides, the corresponding free acids, mono-amides, diamides, imides and imimides of said acids, the ortho-arylene cyano-carboxylic acids, and ammonium salts of the latter; the improvement which comprises feeding the reacting compounds into a reacting chamber at a substantially continuous and uniform rate, the reaction chamber having an essentially oxygen-free atmosphere and containing an amount of dry, granular previously formed phthalocyanine equal to at least two hours of such feed, and removing the reacted material from the chamber substantially at the rate of feed.

2. In the process of claim 1, including in the feed components a catalyst.

3. In the process of claim 2 using as a catalyst a compound of a metal of the group consisting of molybdenum and zirconium.

4. In the process of claim 1, substituting at least a part of phthalic anhydride with mono-chloro-phthalic anhydride.

5. In the process of claim 1, substituting at least a part of the phthalic anhydride with mono-sulfo-phthalic anhydride.

6. In the process of claim 1, maintaining the reacted material at a temperature of from 130° C. to 250° C.

7. In the production of phthalocyanine compounds from the required proportions of urea, a compound of the group consisting of phthalic anhydride, chlorophthalic anhydride, sulfophthalic anhydride, phthalimide, phthalamide, ammonium phthalate and phthalonitrile, and a copper salt; the improvement which comprises feeding the reacting compounds into a reacting chamber at a substantially continuous and uniform rate, the reaction chamber having an essentially oxygen-free atmosphere and containing an amount of dry, granular previously formed phthalocyanine equal to at least two hours of such feed, and removing the reacted material from the chamber substantially at the rate of feed.

8. In the process of claim 7, maintaining the reacted material at a temperature of from 130° C. to 250° C.

9. In the production of phthalocyanine compounds from the required proportions of phthalonitrile, and a copper material of the group consisting of metallic copper and a copper compound; the improvement which comprises feeding the reacting compounds into a reacting chamber at a substantially continuous and uniform rate, the reaction chamber having an essentially oxygen-free atmosphere and containing an amount of dry, granular previously formed phthalocyanine equal to at least two hours of such feed, and removing the reacted material from the chamber substantially at the rate of feed.

10. In the process of claim 9, maintaining the reacted material at a temperature of from 130° C. to 250° C.

11. In a process for the production of copper phthalocyanine in a granular, free flowing form from phthalic anhydride, urea, cupric chloride and ammonium molybdate, which reactants having been previously granulated and mixed; the improvement which consists essentially of feeding the reactants substantially continuously and at a uniform rate into a reaction chamber, said reaction chamber having an essentially oxygen-free atmosphere and containing an amount of dry, granular, preformed copper phthalocyanine in sufficient quantity to yield an effluent of said dry free-flowing copper phthalocyanine, heating and agitating the mixture at 200° C. and continuously removing the product.

12. In a process for the production of copper phthalocyanine in a granular, free-flowing form from copper phthalocyanine reactants, the improvement which comprises feeding the reactants into a reaction chamber, said reaction chamber having an essentially oxygen-free atmosphere and containing an amount of dry, granular, preformed copper phthalocyanine, heating and agitating the mixture at 160–250° C., and removing the product.

References Cited by the Examiner

UNITED STATES PATENTS

| | | | |
|---|---|---|---|
| 2,153,300 | 4/39 | Dahlen et al. | 260—314.5 |
| 2,197,860 | 4/40 | Gassner et al. | 260—314.5 |
| 2,413,191 | 12/46 | Palmer et al. | 260—314.5 |

OTHER REFERENCES

F.I.A.T., Final Report, No. 1313, vol. II, pages 278–280 (1948).

WALTER A. MODANCE, *Primary Examiner.*

IRVING MARCUS, *Examiner.*